(12) United States Patent
Arata

(10) Patent No.: US 10,604,233 B2
(45) Date of Patent: Mar. 31, 2020

(54) QUIET SLAT PROPELLER

(71) Applicant: Allen A. Arata, Los Angeles, CA (US)

(72) Inventor: Allen A. Arata, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/804,773

(22) Filed: Nov. 6, 2017

(65) Prior Publication Data

US 2018/0065729 A1    Mar. 8, 2018

Related U.S. Application Data

(62) Division of application No. 14/627,886, filed on Feb. 20, 2015, now abandoned.

(51) Int. Cl.
| | | |
|---|---|---|
| *B64C 11/18* | (2006.01) | |
| *B64D 27/02* | (2006.01) | |
| *B64C 9/24* | (2006.01) | |
| *B64C 11/04* | (2006.01) | |
| *B64C 11/28* | (2006.01) | |
| *B64C 11/00* | (2006.01) | |

(52) U.S. Cl.
CPC ............... *B64C 11/18* (2013.01); *B64C 9/24* (2013.01); *B64C 11/002* (2013.01); *B64C 11/04* (2013.01); *B64C 11/28* (2013.01); *B64D 27/02* (2013.01)

(58) Field of Classification Search
CPC ..... B64C 39/022; B64C 11/325; B64C 11/28; B64C 11/002; B64C 11/065; B64C 3/28; B64C 3/50; B64C 5/08; B64C 9/24; B64C 31/06; B64C 3/56

See application file for complete search history.

(56) References Cited

U.S. PATENT DOCUMENTS

| | | | | |
|---|---|---|---|---|
| 1,932,532 | A | * | 10/1933 | Phillips .................. B64C 23/02 244/58 |
| 2,066,336 | A | | 10/1933 | Crouch et al. |
| 2,369,276 | A | * | 2/1945 | Cameron ................ B64C 11/28 416/131 |
| 2,981,339 | A | * | 4/1961 | Kaplan .................. B64C 11/28 416/142 |
| 3,515,500 | A | | 6/1970 | Nachod |

(Continued)

FOREIGN PATENT DOCUMENTS

| | | |
|---|---|---|
| EP | 2733068 | 5/2014 |
| GB | 432195 | 7/1935 |

(Continued)

OTHER PUBLICATIONS

Canadian Office Action and Search Report corresponding to Canadian Office Action 2,974,137 dated Apr. 2, 2019.

*Primary Examiner* — Christopher D Hutchens

(74) *Attorney, Agent, or Firm* — Tarolli, Sundheim, Covell & Tummino LLP

(57) ABSTRACT

A propeller for an aircraft having a fuselage and a pair of fixed wings includes a mounting member secured to at least one wing. At least one blade is rotatably connected to each mounting member and has an airfoil shape. The at least one blade is in a locked condition during take-off and landing of the aircraft extending parallel to a leading edge of the wing and in an unlocked, rotating condition during flight for propelling the aircraft.

13 Claims, 12 Drawing Sheets

(56) References Cited

U.S. PATENT DOCUMENTS

| | | | |
|---|---|---|---|
| 4,251,040 A * | 2/1981 | Loyd | B64C 39/022 244/1 R |
| 7,594,625 B2 | 9/2009 | Robertson et al. | |
| 8,376,264 B1 * | 2/2013 | Hong | B64C 27/26 244/17.23 |
| 2006/0186261 A1 | 8/2006 | Unzicker | |
| 2010/0013226 A1 * | 1/2010 | Blumer | B64B 1/50 290/44 |
| 2011/0001020 A1 * | 1/2011 | Forgac | B64C 29/0033 244/7 A |
| 2011/0101692 A1 * | 5/2011 | Bilaniuk | B64B 1/10 290/44 |
| 2016/0244147 A1 | 8/2016 | Arata | |
| 2016/0244158 A1 * | 8/2016 | Fredericks | B64C 25/52 |
| 2018/0065729 A1 | 3/2018 | Arata | |
| 2018/0281942 A1 * | 10/2018 | Scott | B64C 29/02 |

FOREIGN PATENT DOCUMENTS

| | | | |
|---|---|---|---|
| WO | WO 96/40554 | 12/1996 | |
| WO | WO-9640554 A1 * | 12/1996 | B64C 23/065 |
| WO | WO 2013/066477 | 5/2013 | |

* cited by examiner

QUIET SLAT PROPELLER

RELATED APPLICATIONS

This application is a divisional application of U.S. application Ser. No. 14/627,886, filed 20 Feb. 2015, the entirety of which is incorporated herein by reference.

TECHNICAL FIELD

The present invention relates to aircraft and, in particular, relates to an aircraft having propeller blades that act as Handley-Page slats during take-off and landing.

BACKGROUND OF THE INVENTION

Some conventional aircraft, such as fixed wing planes, have leading edge flaps or slats, known as Handley-Page slats, to improve the airflow around and across the fixed wings during take-offs and landings. These flaps/slats add weight to the aircraft and increase the complexity of the wings. Furthermore, the slats and must be carefully stowed in the wings for cruise flight to avoid drag while being capable of extension into the airflow during take-off and landing. Some aircraft, such as the V-22 Osprey, have large propellers and avoid ground clearance issues by tilting the heavy engines and propellers. No improvement to the airfoil shape across the wing, however, is obtained by this tilting design.

SUMMARY OF THE INVENTION

In accordance with an embodiment of the present invention a propeller for an aircraft having a fuselage and a pair of fixed wings includes a mounting member secured to at least one wing. At least one blade is rotatably connected to each mounting member and has an airfoil shape. The at least one blade is in a locked condition during take-off and landing of the aircraft extending parallel to a leading edge of the wing and in an unlocked, rotating condition during flight for propelling the aircraft.

In accordance with another embodiment of the present invention an aircraft includes a fuselage extending along a centerline from a first end to a second end. A pair of fixed wings extends outwardly from the fuselage. A cross-section of each wing defines an airfoil having a leading edge extending perpendicular to the centerline. A tail is secured to the second end of the fuselage. A first propeller is secured to the first end of the fuselage and is rotatable for propelling the aircraft. A pair of second propellers is secured to the wings. Each second propeller includes a mounting member for securing the second propeller to each wing and at least one blade rotatably connected to the mounting member. Each blade has a locked condition during take-off and landing of the aircraft extending parallel to the leading edge of the respective wing and an unlocked, rotating condition during flight for propelling the aircraft.

In accordance with another embodiment of the present invention a propeller for an aircraft includes a mounting member that secures the propeller to the aircraft. At least one blade is rotatably connected to the mounting member and has an airfoil shape. Each blade has a locked condition during take-off and landing of aircraft extending parallel to an edge of the aircraft and an unlocked, rotating condition during flight for propelling the aircraft.

Other objects and advantages and a fuller understanding of the invention will be had from the following detailed description and the accompanying drawings.

DETAILED DESCRIPTION OF THE INVENTION

Figure 1:
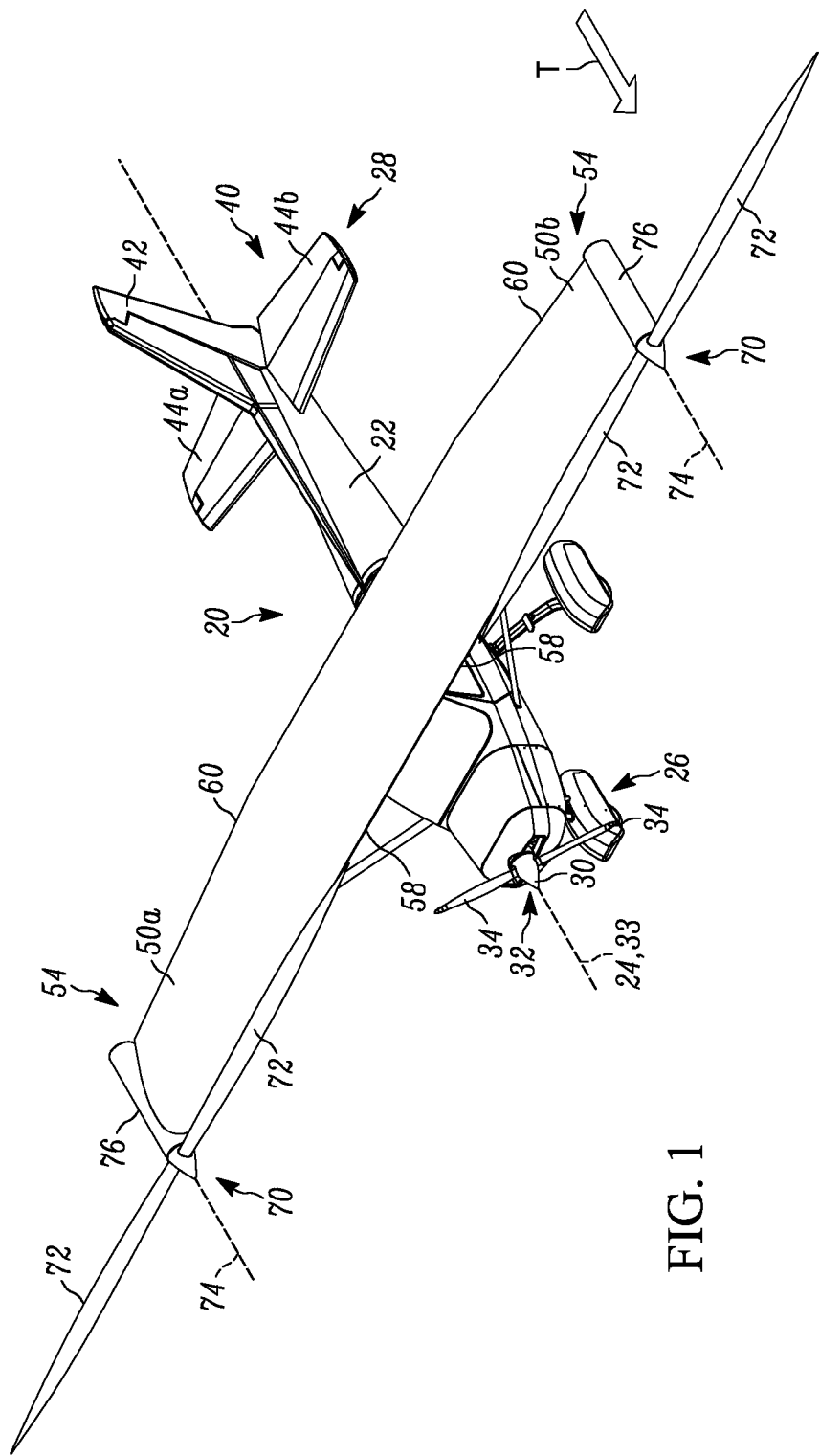
FIG. 1 is a schematic illustration of an aircraft with multiple blade propellers in accordance with an embodiment of the present invention.
Figure 2A:
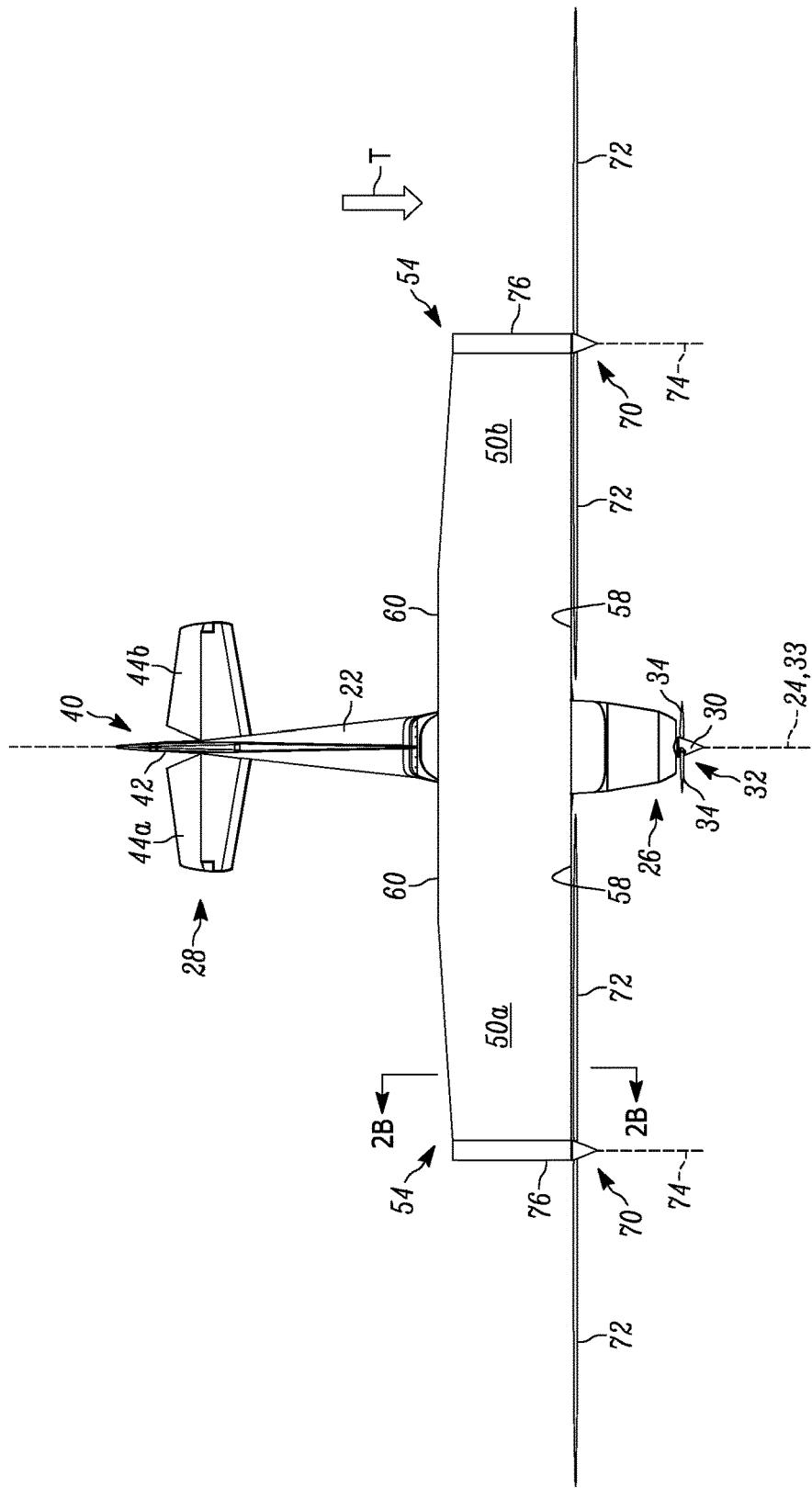
FIG. 2A is a top view of the aircraft of FIG. 1.
Figure 2B:
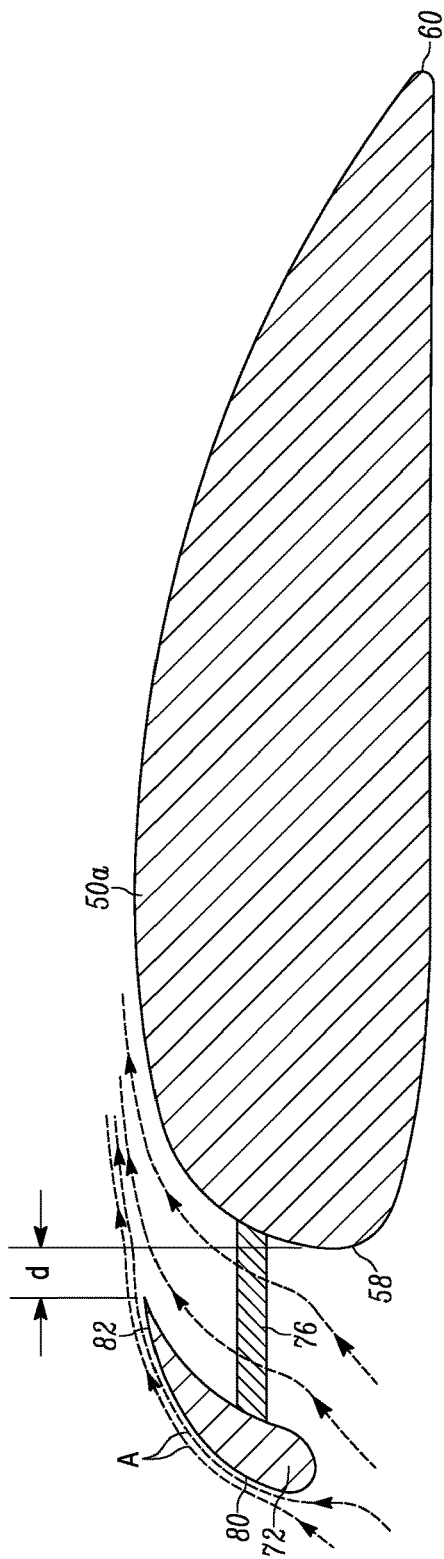
FIG. 2B is a section view of FIG. 2A taken along line 2B-2B.
Figure 3:
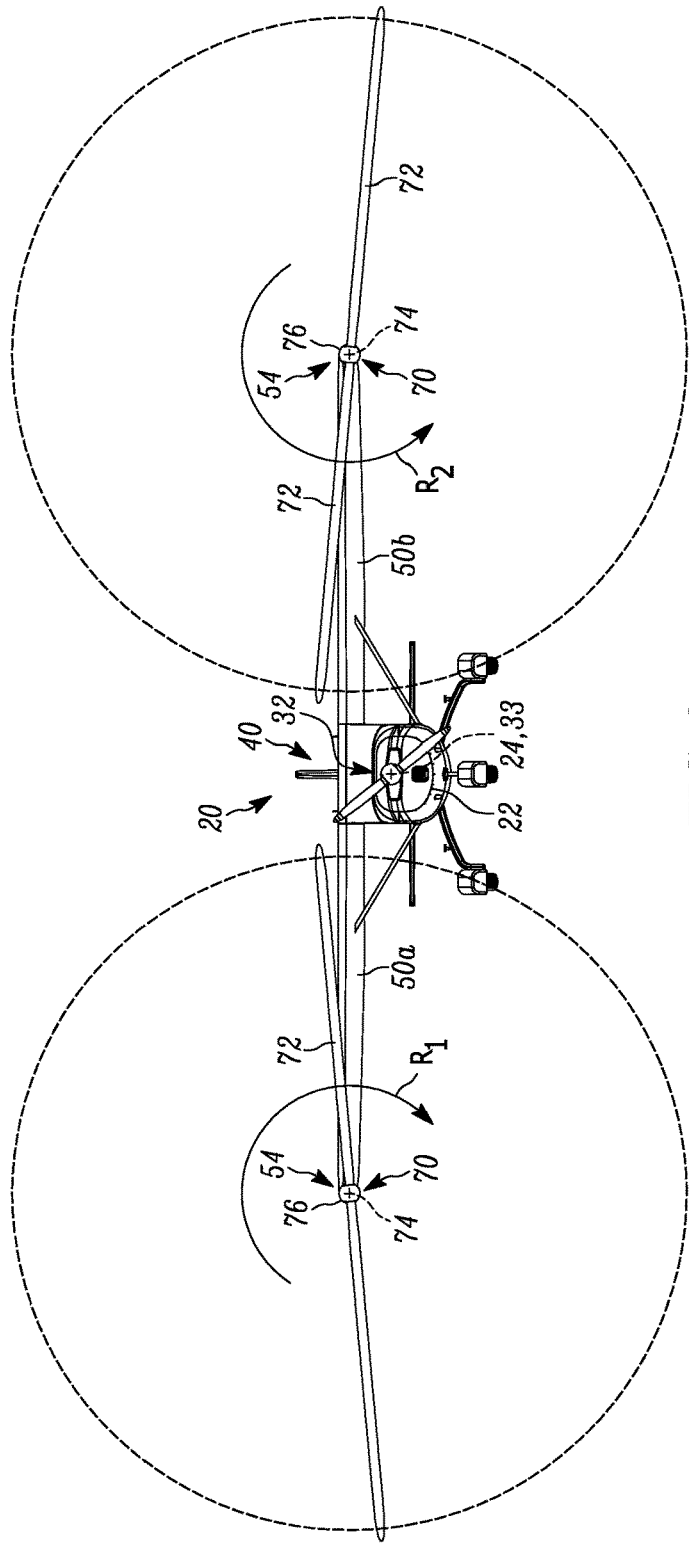
FIG. 3 is a front view of the aircraft of FIG. 1.

The present invention relates to an aircraft and, in particular, relates to an aircraft having propeller blades that act as Handley-Page slats during take-off and landing. FIGS. 1-3 illustrate an aircraft 20 in accordance with an embodiment of the present invention. Referring to FIGS. 1 and 2A, the aircraft 20 constitutes a fixed wing plane includes a fuselage 22 that extends generally along a centerline 24 from a first or fore end 26 or a second or aft end 28. The centerline 24 extends along a direction of travel, indicated by the arrow T, of the aircraft 20. The first end 26 includes a nose cone 30 having a propeller 32. The propeller 32 includes a pair of blades 34 for rotation about an axis 33 extending through the nose cone 30 and coaxial with the centerline 24. The rotating propeller 32 provides thrust to the aircraft 20 during take-off, while in flight, and during landing. The second end 28 of the aircraft 20 includes a tail assembly 40 having a vertical tail 42 and a pair of oppositely extending rear wings 44a, 44b.

A pair of fixed wings 50a, 50b extends from the fuselage 22 between the first and second ends 26, 28 on opposite sides of the centerline 24. The wings 50a, 50b extend substantially perpendicular to the centerline 24 and are larger than the wings 44a, 44b on the tail assembly 40. Each wing 50a, 50b includes an end 54 spaced from the fuselage 22. Referring to FIG. 2B, the wing 50a has a conventional airfoil cross-section including an upstream, leading end 58 and a downstream, trailing end 60. In one example, the airfoil shape is generally rounded at the leading end 58 and narrows in a direction extending towards the trailing end 60. It will be understood that the other wing 50b has the same shape, size, and cross-section as the wing 50a illustrated in FIG. 2B.

A propeller 70 is secured to each end 54 of the fixed wings 50a, 50b. Each propeller 70 includes one or more blades 72 and a mounting member 76 secured to or integrally formed with the end 54 of the wing 50a, 50b. The mounting member 76 extends parallel to the centerline 24. Although FIG. 2A illustrates the mounting member 76 secured to the tip of each wing 50a, 50b, it will be appreciated that the mounting member can be secured anywhere along each wing. As shown in FIGS. 1 and 2A, each propeller 70 includes a pair of blades 72 extending in opposite directions from one another, e.g., the blades are spaced 180° from one another. The blades 72 are rotatable about a common axis 74 extending through the mounting member 76 and parallel to the centerline 24. To this end, a motor (not shown) is provided in the end 54 of each wing 50a, 50b for rotating the blades 72 of each propeller 70 through the mounting member 76. The propellers 70 are counter-rotative in that the blades 72 on the propeller 70 attached to the wing 50a rotate clockwise in the direction $R_1$ about the axis 74 while the blades 72 on the propeller 70 attached to the wing 50b rotate counter-clockwise in the direction $R_2$. The counter-rotation balances the effects of torque and P-factor on the aircraft 20, thereby helping to eliminate critical engine problems.

Referring to FIG. 2B, each blade 72 has an airfoil cross-section including an upstream, leading end 80 and a downstream, trailing end 82. In one example, the airfoil shape is generally rounded at the leading end 80 and narrows in a direction extending towards the trailing end 82. The cross-section of the blade 72 is therefore similar to the cross-section of each wing 50a, 50b. When the propellers 70 are connected to the mounting members 76 on the upstream side of the wings 50a, 50b, the leading end 80 of the blades 72 extend parallel to the leading end 58 of the wing to which the blades are attached. The entirety of each blade 72 is spaced a fore-aft distance (d) from the leading edge 58 of the wings 50a, 50b.

Referring to FIG. 1, during take-off of the aircraft 20, the propeller 32 rotates about the axes 73 to provide thrust to the aircraft in the direction T. At this time, the blades 72 of the propeller are held stationary relative to the wings 50a, 50b such that the blades extend parallel to the wings and generally within the same plane as the wings (see FIG. 2B). More specifically, the leading edges 80 of the blades 72 are locked in a fixed position extending parallel to the leading edges 58 of the wings 50a, 50b. This locks the blades 72 in a substantially horizontal plane in which all the blades are substantially aligned in the longitudinal direction with one another. To achieve this, a brake or locking mechanism (not shown) known in the art can be provided at the mounting member 76 and coupled to the motor for selectively preventing rotation of the blades 72 in the directions $R_1$, $R_2$, thereby locking the blades in the desired position. One or more known sensors (not shown) can cooperate with the locking mechanism to ensure the blades 72 are held at the proper orientation about the axes 74.

Once the aircraft 20 is in flight, the locking mechanisms release the propellers 70 to allow the motors to rotate the blades 72 in the respective directions $R_1$, $R_2$ to provide additional thrust to the aircraft in the direction T. When landing is desired, the propellers 70 are again locked in place by the locking mechanism to place the leading edges 80 of the blades 72 in position extending parallel to the leading edges 58 of the wings 50a, 50b. The propeller 32 keeps rotating while the propellers 70 are locked to maintain thrust T to the aircraft 20 and, thus, the propeller 32 provides the only thrust to the aircraft 20 during landing.

The propellers 70 of the present invention are advantageous in that some of the blades 72 act as Handley-Page slats for take-off and landing of the aircraft 20. In particular, during take-off and landing of the aircraft 20, locking the blades 72 positions some of the blades directly upstream of the leading end 58 of the respective wing 50a, 50b. More specifically, the inner blades 72 closer to the fuselage 22 are positioned adjacent the leading ends 58 of the wings 50a, 50b. The outer blades 72 extend beyond the ends 54 of the wings 50a, 50b. Due to the airfoil shape and positioning of the inner blades 72, the incoming airstream A flowing towards the leading end 80 of the blade 72 is guided towards and over the top of the respective wing 50a, 50b by the inner blades (see FIG. 2B). The shape of the inner blades 72 is specifically designed to guide the airstream A over large angles of attack onto and over the wings 50a, 50b. In doing so, the inner blades 72 help keep the airstream A attached to the wings 50a, 50b, which provides greater lift to the wings. This increases the lift coefficient and extends the versatility of the wings 50a, 50b, thereby improving performance of the aircraft 20 during take-off and landing.

Since the stationary inner blades 72 function as Handley-Page slats during take-off and landing of the aircraft 20, there is no need for conventional slats that must be mechanically retracted and extended during take-off and landing. Moreover, providing two blades 72 per propeller 70 allows the blades to rotate $R_1$, $R_2$ at slower speeds, which reduces the noise of the propellers over conventional propellers. Aircraft propeller noise is directly related to propeller speed. One way to reduce propeller speed is to have larger propellers that rotate slower. The diameter of the propellers, however, are normally limited by ground clearance, rail launch clearance, and other physical impediments. By storing the blades 72 of the present invention in the plane of the wings 50a, 50b during take-off and landing the present invention advantageously eliminates these clearance issues. The dual purpose blades 72 of the present invention therefore advantageously simplify assembly and operation of the aircraft 20 while reducing the noise output thereof.

Figure 4:
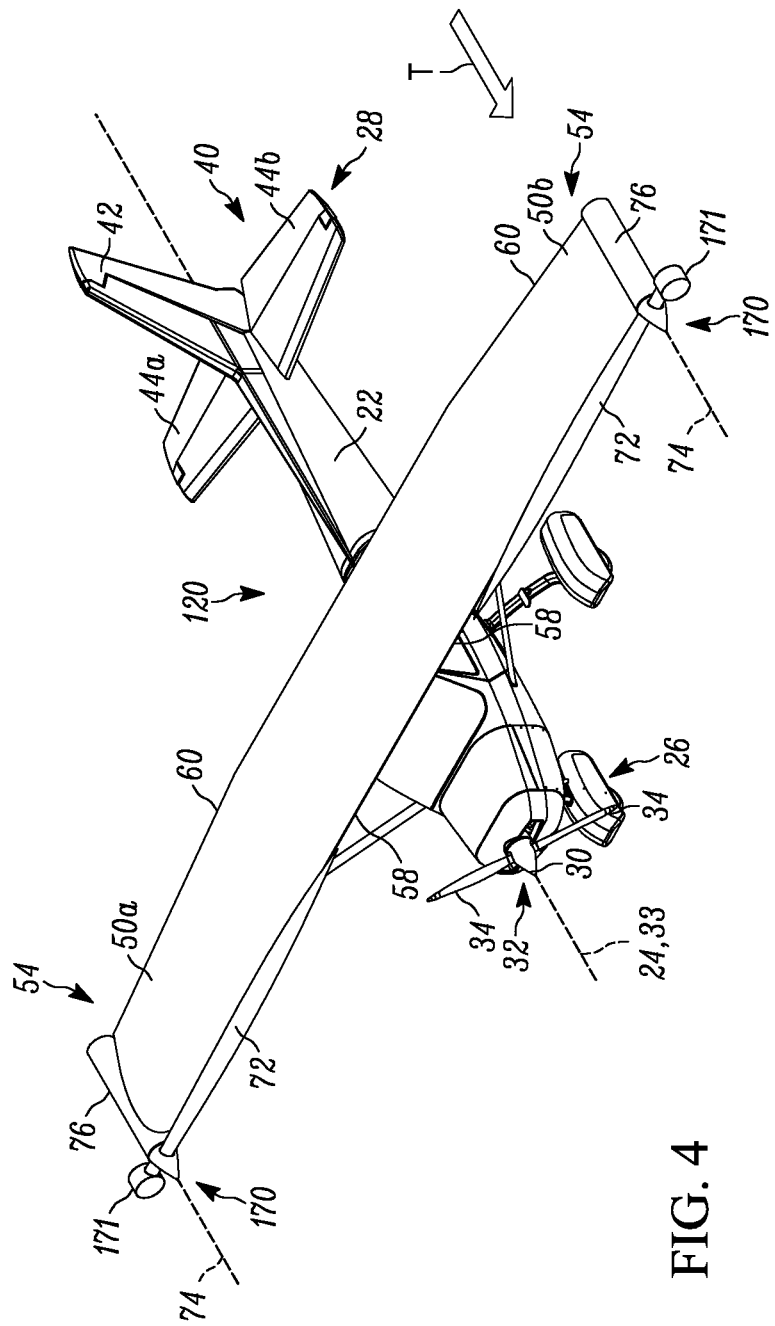
FIG. 4 is a schematic illustration of an aircraft with single blade propellers in accordance with another embodiment of the present invention.
Figure 5A:
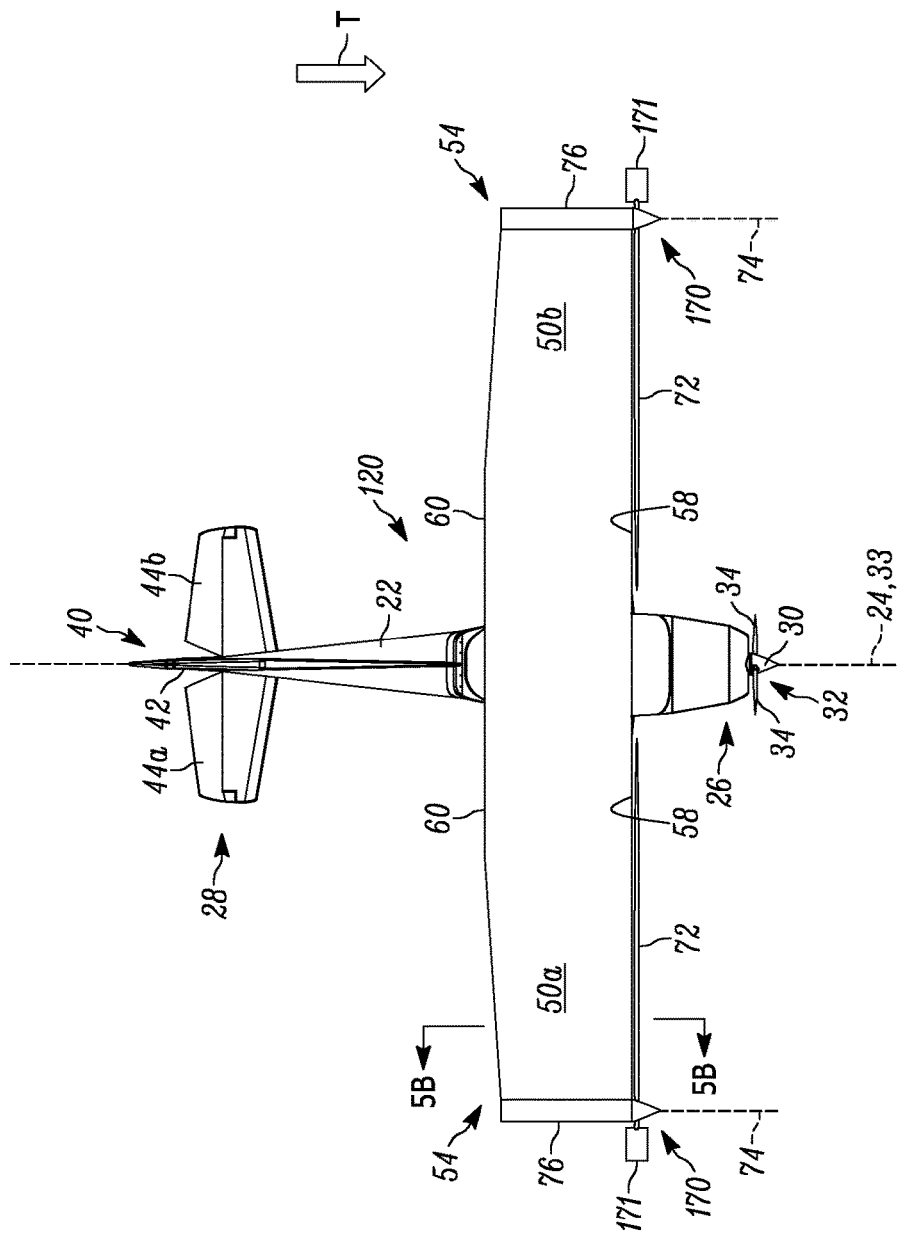
FIG. 5A is a top view of the aircraft of FIG. 4.
Figure 5B:
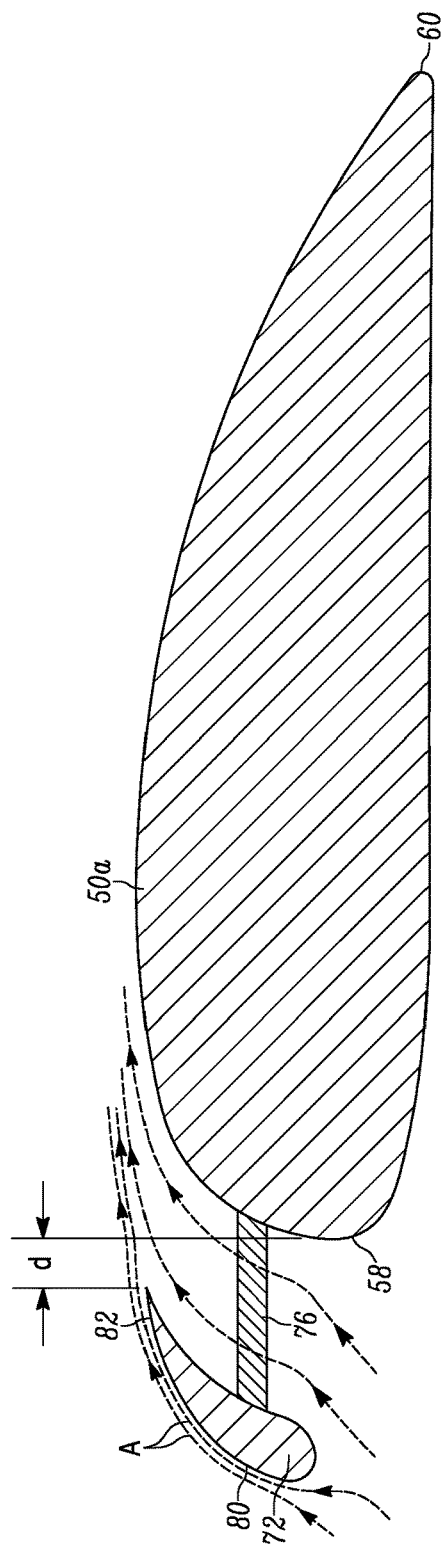
FIG. 5B is a section view of FIG. 5A taken along line 5B-5B.
Figure 6:
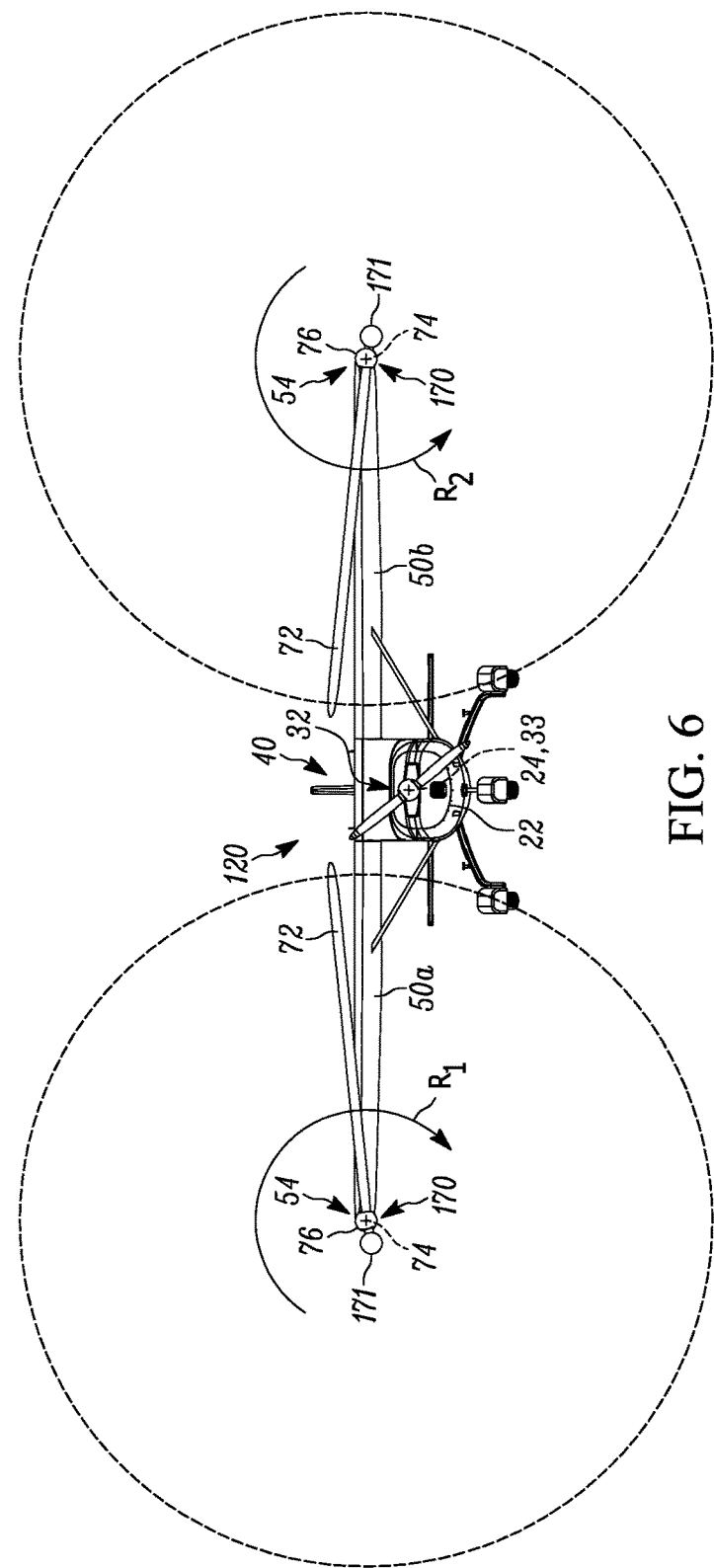
FIG. 6 is a front view of the aircraft of FIG. 4.

FIGS. 4-6 illustrate an aircraft 120 in accordance with another embodiment of the present invention. Features of the aircraft 120 of FIGS. 4-6 that are similar to the features of the aircraft 20 of FIGS. 1-3 are given the same reference number. Referring to FIGS. 4 and 5A, the aircraft 120 includes a pair of propellers 170 with each including a single blade 72. In the locked condition, the blades 72 extend towards one another and the centerline 22 such that the blades are longitudinally aligned with one another. The fixed blades 72 do not extend radially outward of the mounting members 76 and, thus, the mounting members substantially define the lateral extent of the aircraft 120. Mass-weighted counterbalances, illustrated schematically at 171, can be used to reduce loads on the engine and locking mechanism. Each blade 72 of the aircraft 120, when locked in place during take-off and landing, acts as a Handley-Page flap in a manner similar to the blades 72 of the aircraft 20. Referring to FIG. 6, the blades 72 on the aircraft 120, when unlocked, are counter-rotative during flight, with the single blade 72 on the wing 50a rotating in the clockwise direction $R_1$ and the single blade on the wing 50b rotating in the counterclockwise direction $R_2$.

The aircraft 120 of FIGS. 4-6 is advantageous for the same reasons as the aircraft 20 in that the blades 72 of the aircraft 120 serve the dual purpose of rotating $R_1$, $R_2$ to provide thrust during flight and being locked in place to act as Handley-Page slats during take-off and landing. The single blade 72 propellers 170 of the aircraft 120 are further advantageous in that the propellers 170 do not extend radially beyond the mounting members 76 on the ends 54 of the wings 50a, 50b when stationary, thereby reducing the overall size of the aircraft 120, which facilitates storage and transport.

Figure 7:
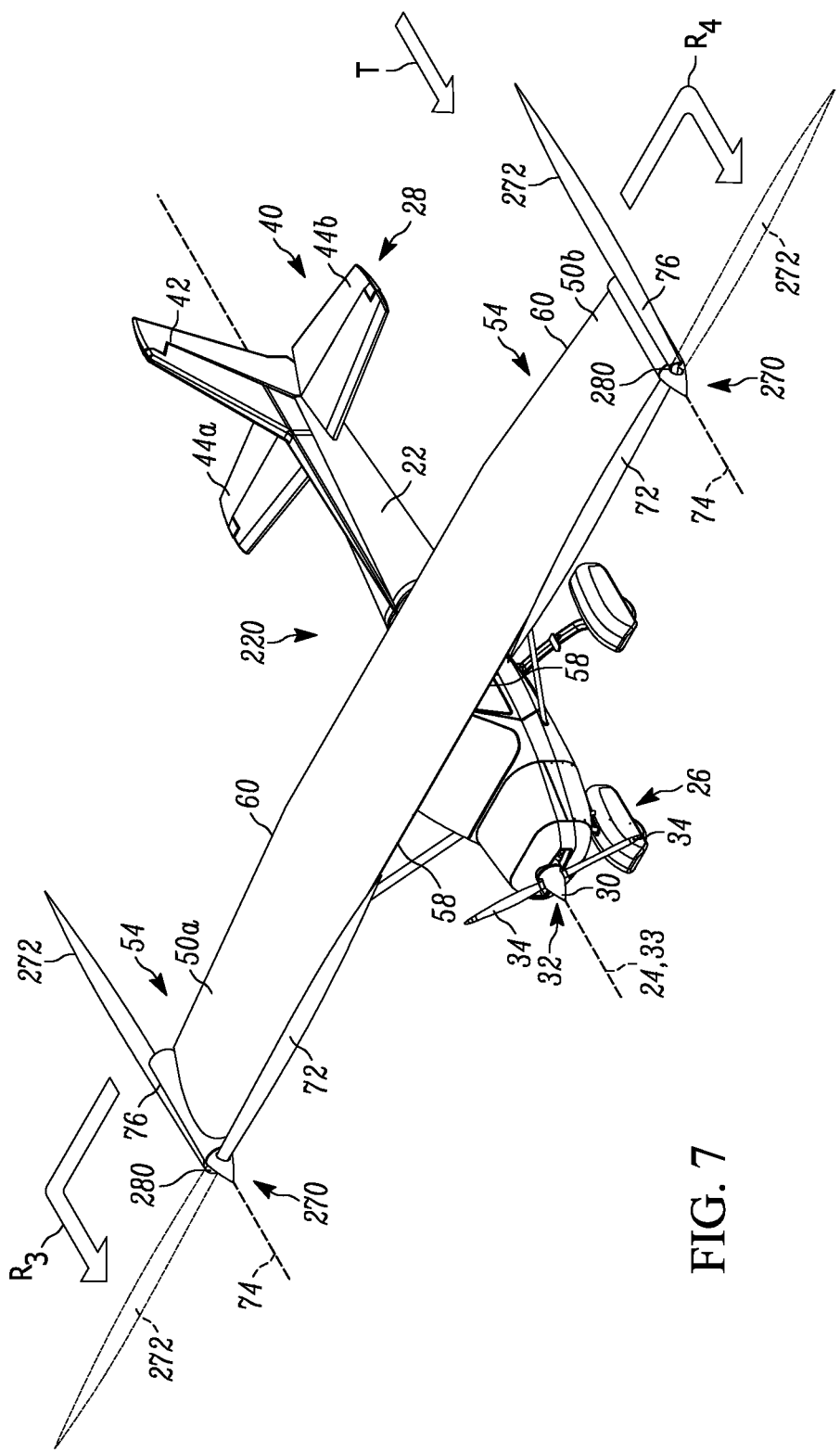
FIG. 7 is a schematic illustration of an aircraft with retractable propellers in accordance with an embodiment of the present invention.
Figure 8:
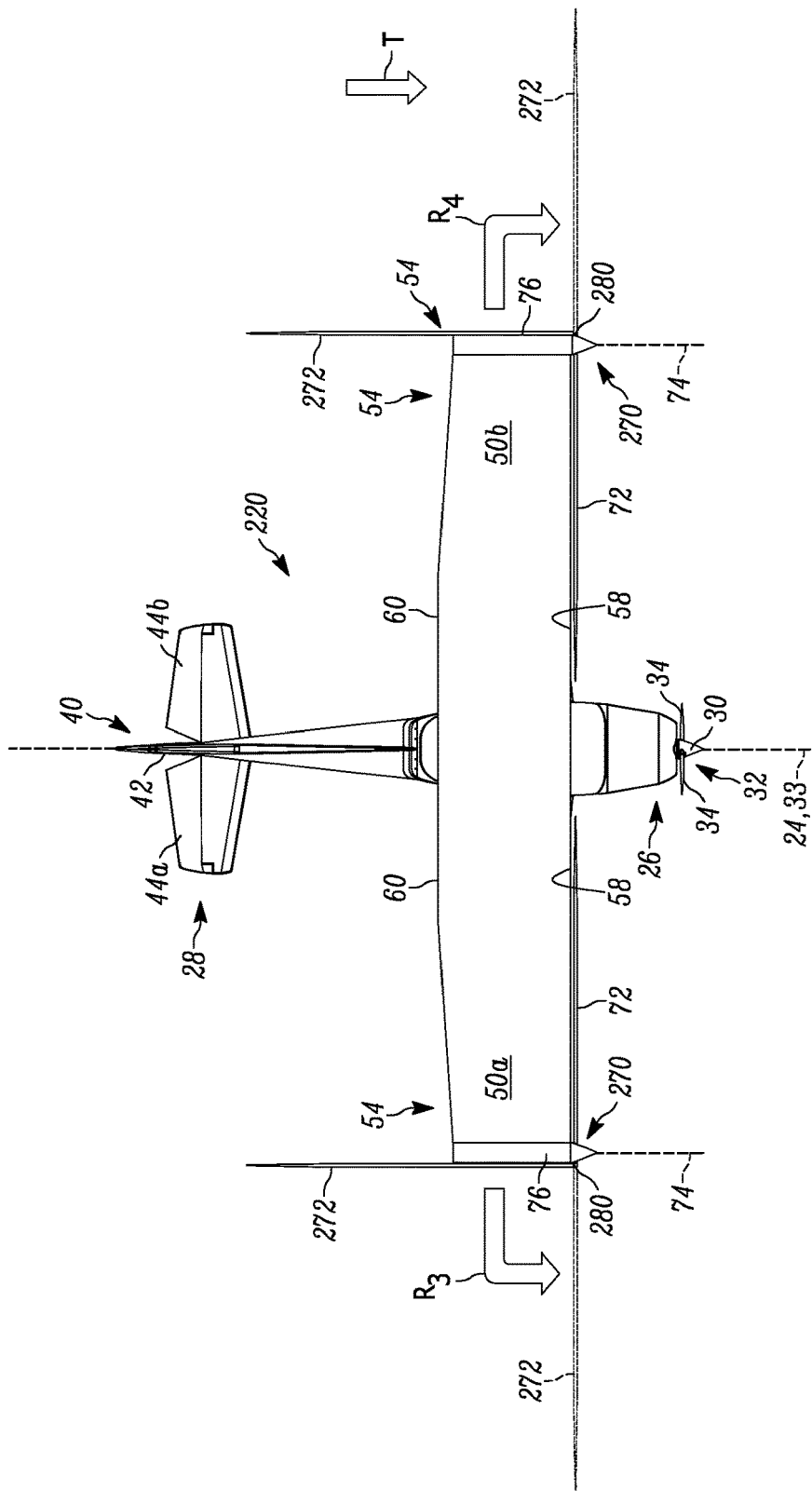
FIG. 8 is a top view of the aircraft of FIG. 7.
Figure 9:
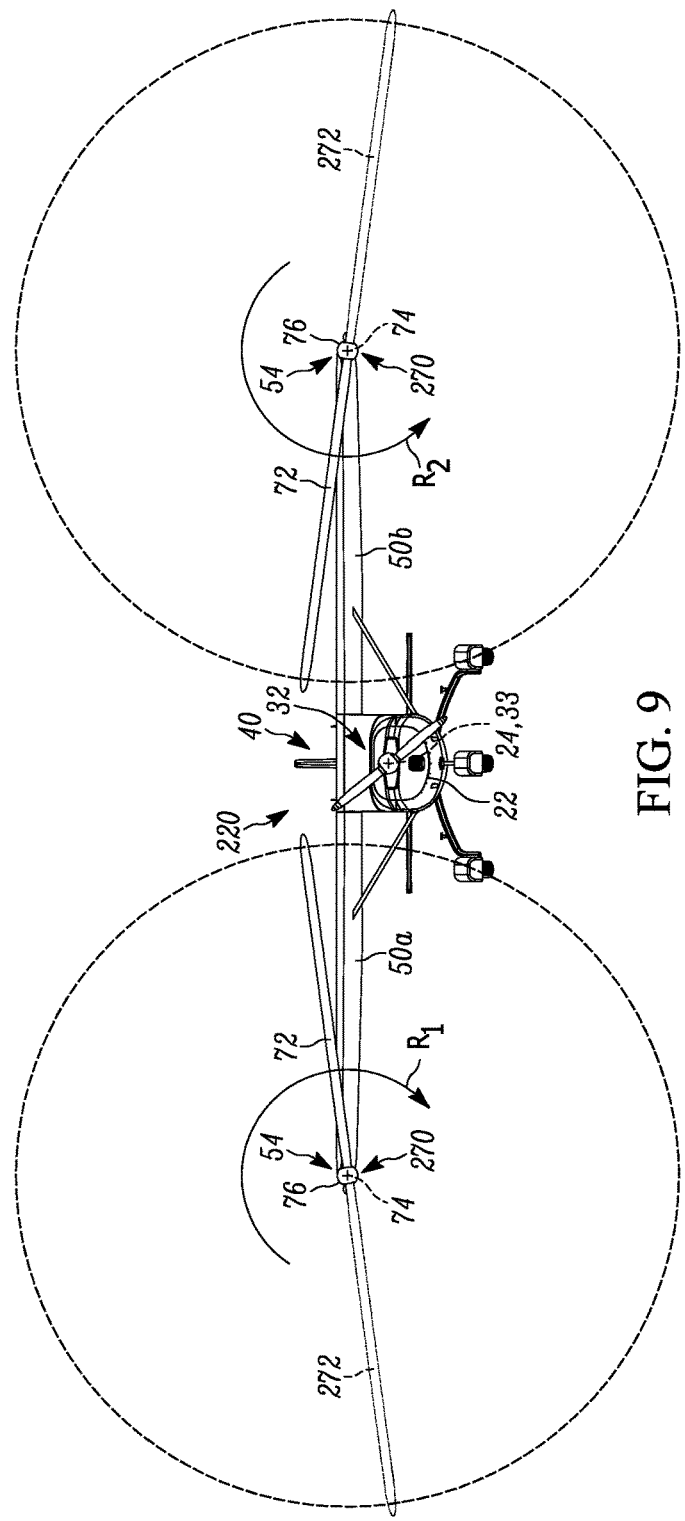
FIG. 9 is a front view of the aircraft of FIG. 7.

FIGS. 7-9 illustrate an aircraft 220 in accordance with another embodiment of the present invention. Features of the aircraft 220 of FIGS. 7-9 that are similar to the features of the aircraft 20 of FIGS. 1-3 are given the same reference number. Referring to FIG. 7, the aircraft 220 includes a pair of propellers 270 with each including a pair of blades 72, 272. The inner blades 72, when locked, extend towards one another and the centerline 24 such that the inner blades are longitudinally aligned with one another in the same manner as the blades 72 in the aircrafts 20, 120.

The outer blades 272, on the other hand, are pivotably mounted to the mounting member 76 via hinges 280. As shown in FIG. 8, the outer blade 272 connected to the wing 50a is pivotable in the direction indicated by the arrow $R_3$ about the hinge 280 between a first, stowed position (indicated by the solid lines 272) extending in the aft direction of the aircraft 200 parallel to the centerline 24 and a second, extended position (indicated by the dashed lines 272) extending parallel to the wing 50a and longitudinally aligned with the inner blade 72 on the wing 50a. Similarly, the outer blade 272 connected to the wing 50b is pivotable in the direction indicated by the arrow $R_4$ about the hinge 280 between a stowed first position (indicated by the solid lines 272) extending in the aft direction of the aircraft 200 parallel to the centerline 24 and an extended second position (indicated by the dashed lines 272) extending parallel to the wing 50b and longitudinally aligned with the inner blade 72 on the wing 50b. A motor (not shown) is provided at the end 54 of each wing 50a, 50b for pivoting the blades 272 about the hinges 280 between the first and second positions.

Prior to flight, e.g., in storage, the inner blades 72 of each propeller 270 are locked in the position extending parallel to the respective wing 50a, 50b and towards the centerline 24. The outer blades 272 are placed in the stowed first position to minimize the space needed to store and transport the aircraft 220. In anticipation of flight, the outer blades 272 are pivoted in the respective directions $R_3$, $R_4$ into the extended second positions, locked in place in longitudinal alignment with the already locked inner blades 72. Each inner blade 72 of the aircraft 220, when locked in place during take-off and landing, acts as a Handley-Page flap in a manner similar to the inner blades 72 of the aircrafts 20, 120. During flight, the blades 72, 272 are unlocked and are counter-rotative, with the blades 72, 272 on the wing 50a rotating in the clockwise direction $R_1$ and the blades on the wing 50b rotating in the counterclockwise direction $R_2$ to produce additional thrust to the aircraft 220 in the direction T.

The aircraft 220 of FIGS. 7-9 is advantageous for the same reasons as the aircrafts 20, 120 in that the blades 72, 272 serve the dual purpose of providing thrust to the aircraft 220 when rotating during flight and [the inner blades 72] acting as Handley-Page slats when locked during take-off and landing. The aircraft 220 is further advantageous in that the pivotable blades 272, when in the stowed first condition, do not extend radially beyond the mounting members 76 on the end 54 of the wings 50a, 50b, thereby reducing the overall size of the aircraft 220 and facilitating storage and transport. The two blades 72, 272, acting together, also reduce the noise of the aircraft 220 for the reasons discussed regarding the aircraft 20. The aircraft 220 of FIGS. 7-9 therefore provides the benefits attributable to both aircrafts 20, 120.

The propellers 70, 170, 270 of the present invention can be used on any sized aircraft, whether manned or unmanned. For example, the propellers 70, 170, 270 can be employed on novelty aircraft, drones (surveillance or combat), other military aircraft, and private and low altitude aircraft, among others. The propellers 70, 170, 270 are advantageous where short take-off and landing is either desirable or the only feasible scenario, e.g., aircraft carriers, military bases, hostile environments, etc. The propellers 70, 170, 270, in combination with the propeller 32, help provide aircraft that are more fuel efficient (cheaper), quieter, and better over long distances than jet engine aircraft.

Additionally, the stowed large wing tip propellers 70, 170, 270 of the present invention improve low speed wing performance, thereby allowing shorter take-offs and landings or higher weight aircraft for a given size. The present invention eliminates leading edge flaps and slats, which simplifies the wing design and improves wing airfoil shape, including the potential for laminar flow. Rotating large wing tip propellers during climb, cruise, and descent also reduce propeller vortex noise by reducing the propeller rotation speed. Vortex noise is a function of propeller velocity to the $6^{th}$ power and, thus, the reduced propeller 70, 170, 270 speed of the present invention allows for dramatic noise reduction.

Figure 11:
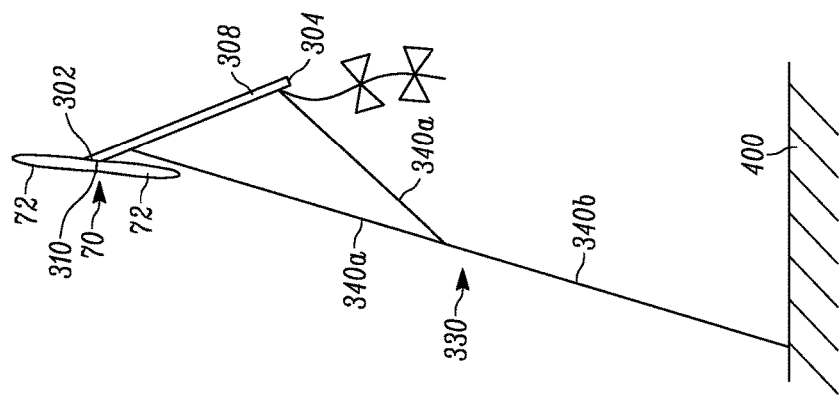
FIG. 11 is a side view of the power-generating kite of FIG. 10.
Figure 10:
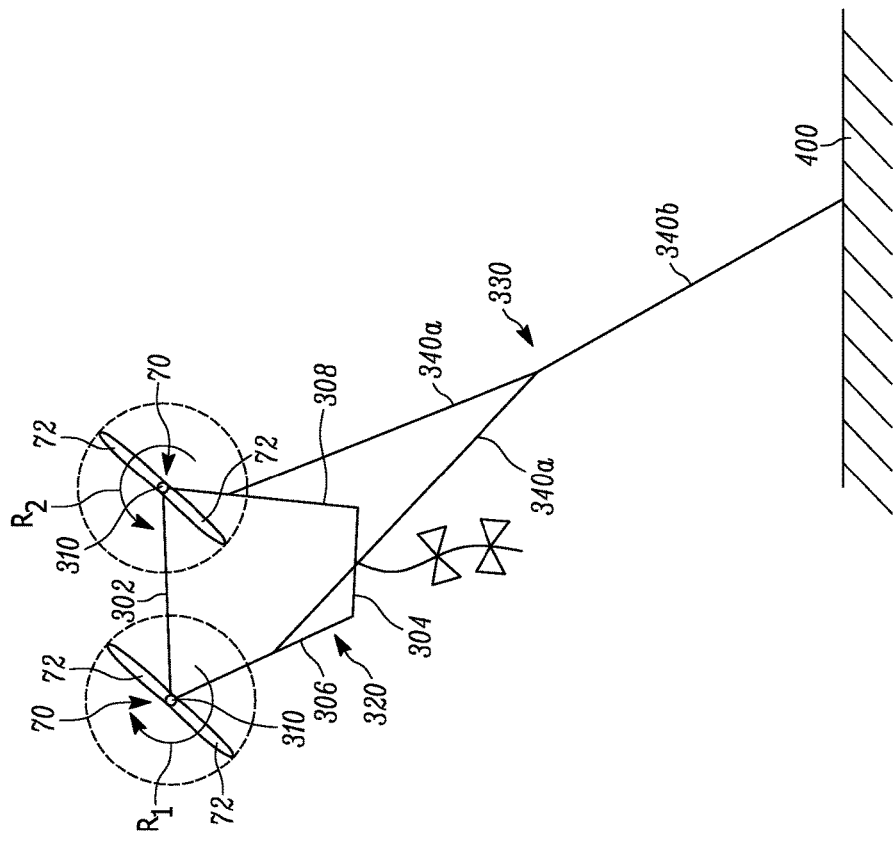
FIG. 10 is a schematic illustration of a power-generating kite with propellers in accordance with another embodiment of the present invention.

FIGS. 10 and 11 illustrate an aircraft 320 in accordance with another embodiment of the present invention. Referring to FIG. 10, the aircraft 320 constitutes a kite for generating electrical power to be sent to a power storage or transmitting device (not shown) on the ground 400. The kite 320 has a trapezoidal shape, but can alternatively have a different polygonal shape. The trapezoidal kite 320 includes a top edge 302, a bottom edge 304 extending parallel to the top edge, and a pair of side edges 306, 308 connecting the top and bottom edges together. The side edges 306, 308 converge in a direction extending towards the bottom edge 304.

A guide wire 330 is connected to the kite 320 and tethers the kite to the ground 400. The guide wire 330 includes a pair of first portions 340a connected to the side edges 306, 308 and a second portion 340b connecting the first portions to the ground 400.

A pair of propellers is secured to the top edge 302 of the kite 220 by mounting members 310. Each propeller can be any of the aforementioned and described propellers 70, 170, 270. As shown, each propeller constitutes the propeller 70 of FIGS. 1-3. The fixed propellers 70 provide added lift to the kite 320. Additionally, the rotating propellers 70 turn a shaft (not shown) for generating electrical power that is subsequently transmitted to a power storage or transmitting device (not shown) on the ground 400. More specifically, in operation the kite 320 rises in altitude with the propellers 70 locked in place and the blades 72 extending parallel to the top edge 302 to increase lift of the kite. Once the desired altitude is reached, the propellers 70 are unlocked and rotated by tag wind in the directions $R_1$, $R_2$ to turn on an electrical generator on the kite 320, which sends electricity down to the ground 400. The kite 320 is capable of remaining airborne for extended periods of time due to the combination of the wind and rotating propellers 70.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A propeller for an aircraft having a fuselage and a pair of fixed wings comprising:
   at least one mounting member secured to at least one wing;
   first and second blades rotatably connected to each mounting member and each having an airfoil shape, the first blade having a locked condition prior to flight of the aircraft extending parallel to a leading edge of the wing and an unlocked, rotating condition during flight for propelling the aircraft, the first blade being in the same plane in both the locked and unlocked conditions, wherein the second blade rotates with the first blade within the plane in an unlocked, rotating condition and is fixed in place extending transverse to the plane and transverse to the first blade when in a stowed condition; and
   a motor for pivoting the second blade relative to the first blade between the stowed condition and the unlocked condition.

2. The propeller recited in claim 1, wherein the airfoil shape of the each first blade has a leading edge extending parallel to a leading edge of the wing when in the locked condition and a trailing edge.

3. The propeller recited in claim 1, wherein the at least one mounting member comprises a mounting member secured to each wing, the first blade on each mounting member extending towards one another such that the first blades are longitudinally aligned with one another when in the locked condition.

4. The propeller recited in claim 1, wherein the first and second blades on each mounting member rotate in opposite directions from one another.

5. The propeller recited in claim 1, wherein each first blade is locked to direct air onto the wing to provide lift to the aircraft.

6. The propeller recited in claim 1, wherein the second blade rotates about an axis in the rotating condition and the motor pivots the second blade towards the axis to the stowed condition.

7. An aircraft comprising:
   a fuselage extending along a centerline from a first end to a second end;
   a pair of fixed wings extending outwardly from the fuselage, a cross-section of each wing defining an airfoil having a leading edge extending perpendicular to the centerline;
   a tail secured to the second end of the fuselage;
   a first propeller secured to the first end of the fuselage and rotatable for propelling the aircraft;
   a pair of second propellers secured to the wings, each second propeller including a mounting member for securing the second propeller to each wing and first and second blades rotatably connected to the mounting member, the first blades having a locked condition prior to flight of the aircraft extending parallel to the leading edge of the respective wing and an unlocked, rotating condition during flight for propelling the aircraft, the first blades being in the same plane in both the locked and unlocked conditions, wherein the second blades rotate with the first blades within the plane in an unlocked, rotating condition and are fixed in place extending transverse to the plane and transverse to the first blades when in a stowed condition; and
   a motor for pivoting each second blade relative to the respective first blade between the stowed condition and the unlocked condition.

8. The aircraft recited in claim 7, wherein the airfoil shape of each first blade has a leading edge extending parallel to the leading edge of the wing when in the locked condition and a trailing edge spaced from the wing.

9. The aircraft recited in claim 7, wherein each first blade is locked to direct air onto the wing to provide lift to the aircraft.

10. The aircraft recited in claim 7, wherein the second blade rotates about an axis in the rotating condition and the motor pivots the second blade towards the axis to the stowed condition.

11. A propeller for an aircraft comprising:
    a mounting member securing the propeller to the aircraft;
    first and second blades rotatably connected to the mounting member and having an airfoil shape, the first blade having a locked condition prior to flight of the aircraft extending parallel to an edge of the aircraft and an unlocked, rotating condition during flight for propelling the aircraft, the first blade being in the same plane in both the locked and unlocked conditions, wherein the second blade rotates with the first blade within the plane in an unlocked, rotating condition and is fixed in place extending transverse to the plane and transverse to the first blade when in the locked condition; and
    a motor for pivoting the second blade relative to the first blade between the locked condition and the unlocked condition.

12. The propeller recited in claim 11, wherein each first blade is locked to direct air onto the edge to provide lift to the aircraft.

13. The propeller recited in claim 11, wherein the second blade rotates about an axis in the rotating condition and the motor pivots the second blade towards the axis to the stowed condition.

* * * * *